United States Patent [19]

Toyama

[11] Patent Number: 4,842,372

[45] Date of Patent: Jun. 27, 1989

[54] ELECTRO-OPTICAL DEVICE HAVING AN AMORPHOUS SILICON RESISTIVE ELEMENT WITH CARBON

[75] Inventor: Motoo Toyama, Tokyo, Japan

[73] Assignee: Seiko Instruments Inc., Tokyo, Japan

[21] Appl. No.: 208,260

[22] Filed: Jun. 17, 1988

[30] Foreign Application Priority Data

Oct. 22, 1986 [JP] Japan .............................. 61-251076

[51] Int. Cl.$^4$ .............................................. G02F 1/13
[52] U.S. Cl. .................................... 350/334; 350/333; 350/339 R
[58] Field of Search ..................... 350/333, 334, 339 R

[56] References Cited

U.S. PATENT DOCUMENTS

| | | | |
|---|---|---|---|
| 3,654,531 | 4/1972 | Krambeck et al. | 317/235 P |
| 4,001,762 | 1/1977 | Aoki et al. | 338/309 |
| 4,223,308 | 9/1980 | Baraff et al. | 340/719 |
| 4,240,710 | 12/1980 | Kozaki et al. | 350/339 |
| 4,389,095 | 5/1983 | Teshima et al. | 350/334 |
| 4,413,883 | 11/1983 | Baraff et al. | 350/334 |
| 4,523,811 | 6/1985 | Ota | 350/339 R X |
| 4,534,623 | 8/1985 | Araki | 350/339 R |
| 4,572,615 | 2/1986 | Nickol et al. | 350/334 |
| 4,583,087 | 4/1986 | van de Venne | 340/719 |
| 4,589,733 | 5/1986 | Yaniv et al. | 340/332 |
| 4,597,162 | 7/1986 | Johnson et al. | 29/574 |
| 4,639,087 | 1/1987 | Cannella | 350/339 R X |
| 4,643,530 | 2/1987 | Yamazaki | 350/339 R |
| 4,666,252 | 5/1987 | Yaniv et al. | 350/339 R X |
| 4,709,992 | 12/1987 | Ueno | 350/339 R |
| 4,728,172 | 3/1988 | Cannella | 350/339 R X |
| 4,730,903 | 3/1988 | Yamazaki et al. | 350/339 R X |
| 4,741,601 | 5/1988 | Saito | 350/339 R |

FOREIGN PATENT DOCUMENTS

| | | |
|---|---|---|
| 0122659 | 10/1984 | European Pat. Off. . |
| 0174431 | 3/1986 | European Pat. Off. . |
| 4460916 | 7/1975 | Fed. Rep. of Germany . |
| 2050031 | 12/1980 | United Kingdom . |

OTHER PUBLICATIONS

Togashi et al., "An LC-TV Display Controlled by a-Si Diode Rings", Proc. SID, vol. 26/1, 1985, pp. 9-15.
Sutherland et al., "Switching effects in metal-insulator-metal thin film devices", Thin Solid Films, vol. 6, No. 4, (1970), pp. R39-R42.
Castleberry, "Control Layers for Liquid Crystal Matrix Displays", 1980 Biennial Display Research Conference, 1980, pp. 89-92.
Suzuki et al., "A New Active Diode Matrix LCD Using Off-Stoichiometric $SiN_x$ Layer", Japan Display '86, 1986, pp. 72-74.
Toyoma et al., "A Large-Area Diode-Matrix LCD Using $SiN_x$ Layer", SID 87 Digest, 1987, pp. 155-158.
Gladstone et al., "Liquid Crystal Display Devices", IBM Technical Disclosure Bulletin, vol. 14, No. 5, Oct. 1971, pp. 1472-1473.
D. J. DiMaria et al., "Charge transport and trapping phenomena in off-stoichiometric silicon dioxide films", J. Appl. Phys., vol. 54, No. 10, Oct. 1983, pp. 5801-5827.
D. J. DiMaria et al., "High current injection into $SiO_2$ from Si rich $SiO_2$ films and experimental applications", J. Appl. Phys., vol. 51, No. 5, May 1980, pp. 2722-2735.
M. Miyake et al., "Conductive layer formation by High-dose Si ion implantation into $SiO_2$", Applied Physics Letters, vol. 46, No. 9, May 1985, pp. 879-881.

Primary Examiner—Stanley D. Miller
Assistant Examiner—Richard Gallivan
Attorney, Agent, or Firm—Bruce L. Adams; Van C. Wilks

[57] ABSTRACT

An electro-optical device comprising: a pair of substrates, at least one of the substrates being light-transmissive; an electro-optical material sandwiched between the substrates; a plurality of electro-optical switching elements disposed on an inner surface of at least one of the substrates, each of the switching elements including a first electrode layer, a non-linear-resistive layer substantially composed of an amorphous material of silicon and carbon and a picture element electrode electrically connected to the first electrode layer through the non-linear-resistive layer; and a second electrode layer disposed on an inner surface of the other substrate to define a plurality of elements between the second electrode layer and the plurality of picture element electrodes for applying a voltage to the electro-optical material in a desired picture element.

13 Claims, 3 Drawing Sheets

ELECTRO-OPTICAL DEVICE HAVING AN AMORPHOUS SILICON RESISTIVE ELEMENT WITH CARBON

BACKGROUND OF THE INVENTION

This invention relates to an electro-optical device having a large number of pixels which is used in the display panels of measuring instruments, instrument panels of cars, personal computers, picture display apparatus, television sets, liquid crystal shutters for printers, etc.

The present invention resides in an electro-optical device of matrix configuration having a large number of row and column electrodes, and is featured in that nonlinear resistance elements made of an amorphous material whose main components are silicon and carbon are formed in series with a layer made of a material having electro-optical effect, one for each pixel including a driving electrode made of that layer, so that large contrast can be obtained even if driven by low voltage, and the power consumption of the device is reduced.

Small-size and light-weight electro-optical devices have been realized using materials, such as liquid crystal, having electrochromism or electro-optical effect. Recently, for the purpose of increasing the amount of information handled in electro-optical devices of this type, attention has been given to a three-terminal active matrix liquid crystal display device made of TFT thin-film transistors, MOS transistors formed on a silicon monocrystal, etc., and to a two-terminal active matrix liquid crystal display device in which each nonlinear resistance element is provided in series with each liquid crystal pixel.

The two-terminal-element active matrix includes a small number of films formed in place as compared with the three-terminal-element active matrix, and thus needs only a reduced number of photo-etching processes; accordingly, its advantages are that a possibility of the device becoming defective owing to dust and the like is small and that the precision of patterning is not necessary to be high; hence, this type of active matrix can be applied to low-cost and large-area electro-optical devices.

The two-terminal active matrix electro-optical device will take one of the following systems, as well known in the art.

(1) MIM (metal insulator metal) system

This system is disclosed, for example, in U.S. Pat. No. 4,413,883, and can be driven by low voltage but has the disadvantage that the number of divisions cannot be increased too much because its current-voltage characteristic is not steep enough.

(2) Ring diode system

This system features every two amorphous Si pin diodes connected parallelly and reversely with each other, as disclosed in U.K. Patent GB 2129183, and its currentvoltage characteristic is comparatively steep. However, it has the disadvantage that the configuration of elements and the manufacturing process are complicated, that is, each pixel needs two diodes and the diodes must be made of three layers (p-layer, i-layer, and n-layer) of amolphous Si.

(3) ZnO varistor system

This system is disclosed, for example, in Japan Patent Publication (Kokai) No. 105285/1980. It has a good nonlinear characteristic, but is defective in that the driving voltage is as high as some tens of volts and an ordinary liquid crystal driving IC cannot be used. Also, it has the disadvantage that this system cannot provide a transmission type display because ZnO of a substrate is opaque.

(4) Back-to-back diode system

This system utilizes the property of a Schottky junction portion between amorphous Si and a metal electrode which shows a nonlinear characteristic, thus its configuration is comparatively simple. However, this system has not yet provided a sufficient nonlinear characteristic for the electro-optical device.

To drive the electro-optical liquid crystal device, the current-voltage characteristic of a nonlinear element film and the allocation of voltage to a liquid crystal layer must be made optimal, and therefor, the resistance and capacitance of the nonlinear element film and of the liquid crystal layer must be selected optimally.

In the prior art, for the electro-optical devices of the MIM system or the like, some compound (e.g. $Ta_2O_5$) having a certain specific resistance and a certain dielectric constant was selected as the material of the nonlinear elements, and the resistance of a nonlinear element film was determined by regulating the film thickness. However, if the film thickness is varied to make the film reistance approach a desired value, the capacitance of the nonlinear elements varies also and cannot approach a desired value; on the contrary, if the film thickness is regulated to make the capacitance approach a desired value, the resistance cannot approach a desired value. Thus the prior art could not meet both the current-voltage characteristic of the nonlinear element film and the allocation of voltage to the liquid crystal layer simultaneously.

FIG. 2 illustrates a prior invention which was devised to overcome the foregoing defects and is disclosed in greater detail, for example, in U.S. patent application Ser. No. 784,239 (European Patent Application Publication No. 182484A) and U.S. patent application Ser. No. 863,199 (European Patent Application Publication No. 202092A).

In FIG. 2, reference numeral 7 represents a lower transparent substrate, which is made of ordinary glass. Reference numeral 8 represents a transparent conductive film which is formed by magnetron sputtering of an indium tin oxide (ITO) film. Photoetching is used for the pattern formation. Reference numeral 12 represents a nonlinear resistance layer made of an amorphous material consisting principally of silicon and oxygen, or principally of silicon and nitrogen.

Reference numeral 4 represents a metal electrode which is one of the row and column electrodes. Reference numeral 5 represents a liquid crystal layer having a twist nematic structure. Reference numeral 10 represents an upper transparent substrate, which is made of ordinary glass. Reference numeral 11 represents a transparent conductive film ITO formed on the upper transparent substrate, which is used either as the row electrode or as the column electrode.

Row liquid crystal driving electrodes and column liquid crystal driving electrodes are formed on a substrate and on an opposed substrate, respectively, which are normally 100–1000 in number per group. Each X-Y intersection has a liquid crystal 5 and a nonlinear resistance element 12 formed in place.

In this type of liquid crystal electro-optical device, to provide large-area and high-resolution devices or devices having a large number of pixels while keeping high contrast, the nonlinearity of the nonlinear resistance element 12 must be sufficiently large. Accordingly, where the nonlinear resistance film is made of the silicon nitride film whose composition of silicon is greater than the stoichiometric composition as done in the prior art (see FIG. 2 and curve b of FIG. 4), its nonlinearity is not sufficient, hence, large-area devices made accordingly give only low contrast. Further, because the nonuniformity of distribution of the film thickness of the nonlinear resistance film 12 magnifies with increasing area of the device and the nonlinearity of the nonlinear resistance film 12 is small, this uneven distribution of film thickness results in display flecks. Further, where the non-linearity of the nonlinear resistance element 12 is not sufficiently high, a voltage to be applied across A-C of FIG. 6 must be large in order to make an effective voltage to be applied to the liquid crystal at a selected point large than the saturation voltage of the liquid crystal; hence, the power consumption of the device becomes large.

SUMMARY OF THE INVENTION

It is an object of the present invention to provide an electro-optical device employing novel two-terminal nonlinear elements.

It is another object of the present invention to provide an elecro-otpical device employing nonlinear elements capable of being driven by low voltage and giving large contrast.

It is still another object of the present invention to provide a method and an elector-optical device which permit free selection of the composition of nonlinear elements, thereby allowing the realization of the optimum current-voltage characteristic and the optimum allocation of voltage to a liquid crystal layer.

It is a further object of the present invention to provide a thin film of high nonlinearity usable as a nonlinear resistance film, with which a large-size electro-optical device can have high contrast, decreased display flecks, and reduced power consumption for driving.

DESCRIPTION OF THE PREFERRED EMBODIMENTS

To solve the afore-mentioned problems, the present invention uses an amorphous material whose main components are silicon and carbon as a nonlinear resistance film. Accordingly, there can be obtained nonlinear resistance elements showing high nonlinearity, which are employed for driving of an electro-optical device.

Figure 1:
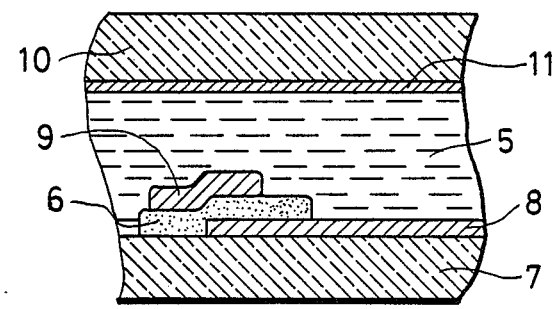
FIG. 1 is a vertical sectional view of an electro-optical device according to the present invention using a nonlinear resistance material whose main components are silicon and carbon.
Figure 2:
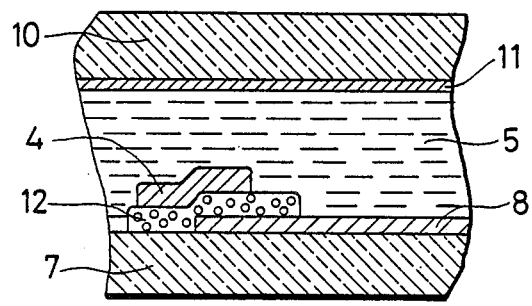
FIG. 2 is a vertical sectional view of a conventional electro-optical device using a nonlinear resistance material whose main components are silicon and nitrogen.
Figure 5:
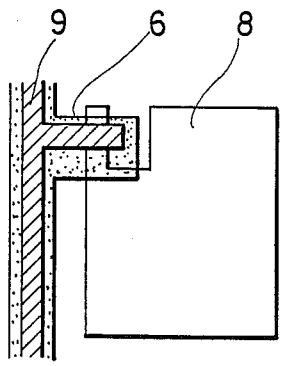
FIG. 5 is a plan view of one pixel portion of the liquid crystal electro-optical device.

FIG. 1 is a vertical sectional view of an electro-optical device of the invention having a substrate on which a nonlinear resistance element is formed. FIG. 5 is a plan view of the nonlinear resistance element. These figures illustrate only one pixel, and a liquid crystal layer, another substrate opposed to the substrate for holding the liquid crystal layer and a polarizer are omitted from the drawing for ease of illustration.

In FIG. 1 to 5, reference numeral 7 represents a substrate made of transparent glass, and ordinary glass is used. Reference numeral 8 represents a transparent conductive film which has a thickness from about 100 Å to 500 Å and is formed by magnetron sputtering of an indium tin oxide (ITO) film. Photoetching is used for the pattern shaping. Reference numeral 6 represents a nonlinear resistance layer made of an amorphous material consisting principally of silicon and carbon.

Reference numeral 9 represents a metal electrode which is one of the row and column electrodes. In this embodiment, the metal electrode 9 is formed in a thickness of about 3,000 Å by sputtering metallic chromium. Besides chromium, it is possible to use Al, Cu, NiCr, Ag, Au and Ta. Next, the metal electrode 9 is selectively removed by photoetching, and while a photosensitive resin is not removed, the amorphous layer 6 consisting principally of silicon and carbon is selectively etched. As a result, the nonlinear resistance element is produced by the two photomask steps and the three etching steps. In FIG. 1, reference numeral 5 represents a liquid crystal layer, which is about 7 $\mu$m thick, and uses a twist nematic structure. Reference numeral 10 represents an upper transparent substrate, which is made of ordinary glass. Reference numeral 11 represents transparent conductive film ITO formed on the upper transparent substrate, which is used either as the row electrode or as the column electrode.

Figure 6:
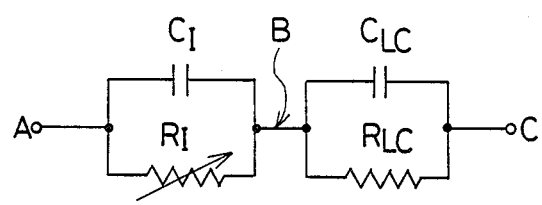
FIG. 6 is an equivalent circuit diagram of one pixel, showing a nonlinear resistance element and a liquid crystal connected in series together, wherein $C_{LC}$ is the capacitance of the liquid crystal, $R_{LC}$ is the resistance of the liquid crystal, $C_I$ is the capacitance of the nonlinear resistance element, and $R_I$ is the resistance of the nonlinear resistance element which is a function of voltage.

FIG. 6 is an equivalent circuit diagram of one pixel, and a nonlinear resistance element and a liquid crystal are shown connected to series with each other. Symbol $C_{LC}$ represents the capacity of the liquid crystal, $R_{LC}$ is its resistance, and $C_I$ is the capacity of the nonlinear resistance element with $R_I$ representing its resistance. The resistance R1 is a function of the voltage between portions A and B.

Driving of this type of liquid crystal electro-optical device is generally performed by the following multiplex driving system called a voltage uniformalizing driving system.

Figure 3:
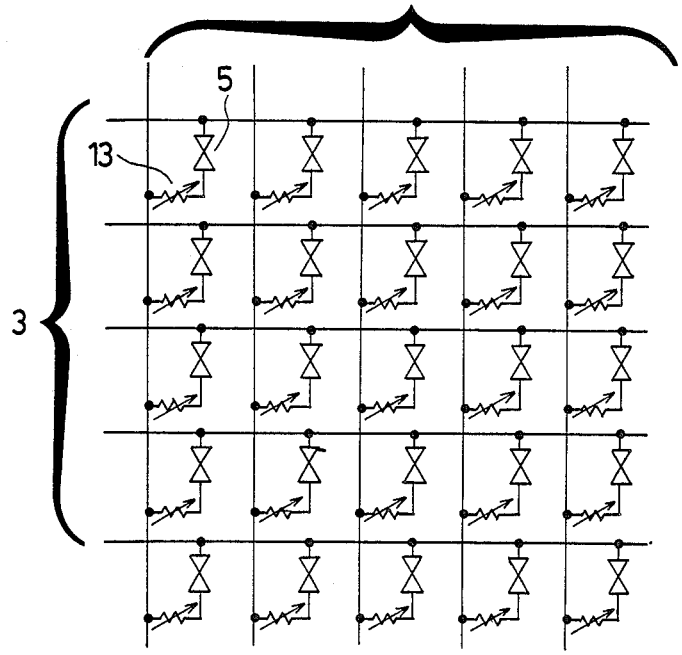
FIG. 3 is a circuit diagram of a liquid crystal electro-optical device using nonlinear resistance elements.

That is, a large number of row electrode 3 shown in FIG. 3 are sequentially selected one at a time, and during such selection periods data are written in by column electrodes 9. To present a display with sufficient contrast, it is required that an effective voltage to be applied to a liquid crystal at a selected point should be larger than the saturation voltage of the liquid crystal and that the effective voltage to be applied to the liquid crystal at non-selected points should be smaller than the threshold voltage of the liquid crystal. When nonlinear resistance elements 13 are made of a film having sufficient nonlinearity, the resistance of the nonlinear resistance element 13 at the selected point becomes low at the time of writing; as a result, the voltage becomes easily imposed on the liquid crystal 5, the resistance of the nonlinear resistance element 13 becomes high during retaining periods, and the voltage imposed on the liquid crystal 5 becomes easily retained. On the other hand, at each non-selected point, the resistance of the nonlinear resistance element 13 becomes not as low as that of the selected point, the voltage is imposed on the liquid crystal 5 a little, this little voltage being retained, so that even a liquid crystal electro-optical device having a comparatively large number of divisions can provide a panel having high contrast.

Figure 4:
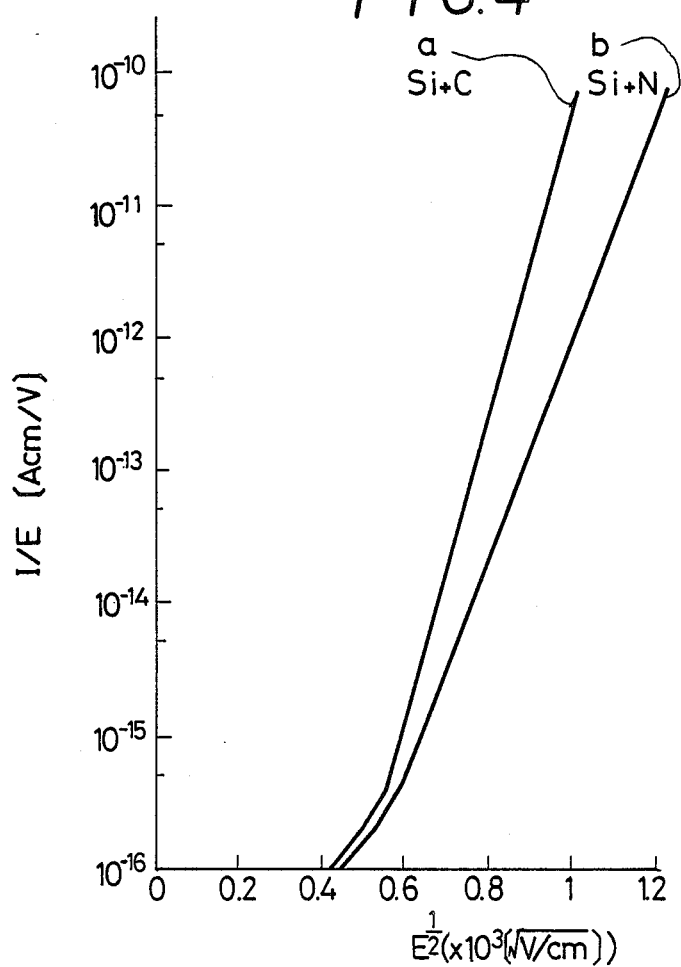
FIG. 4 is a graph showing the Frenkel-Poole plottings of the current - electric field characteristics of nonlinear element (curve a) according to the present invention and conventional nonlinear elements (curve b) made of a silicon nitride thin film.

Curve a of FIG. 4 is the $E^{\frac{1}{2}}-\log (I/E)$ plotting of the nonlinear resistance element made of an amorphous material whose main components are silicon and carbon according to the present invention (E is in electric field, and I is a current). In this graph, a stragiht current-voltage characteristic is called a Frenkel-Poole current and expressed by equation (1):

$$I = CE \exp\{-q (\phi - bE^{\cdot j}/kT\}tm \quad (1)$$

where C, $\phi$ and b are values intrinsic to each substance, k is the Boltzmann's constant, q is an elementary charge, and T is an absolute temperature.

Figure 7:
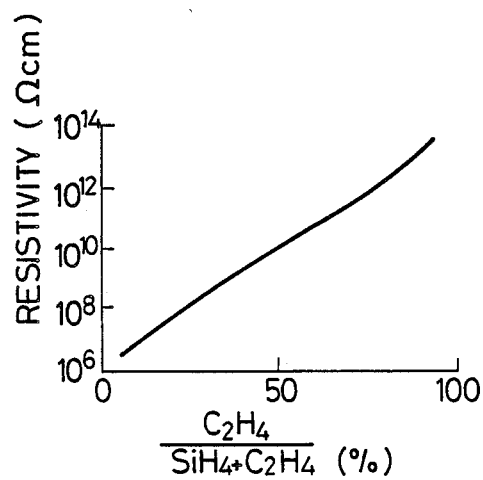
FIG. 7 is a graph showing the relationship under the condition of 1 (MV/cm) between the source gas composition and the specific resistance of an amorphous material whose main components are silicon and carbon, which is employed in the electro-optical device of the present invention.
Figure 8:
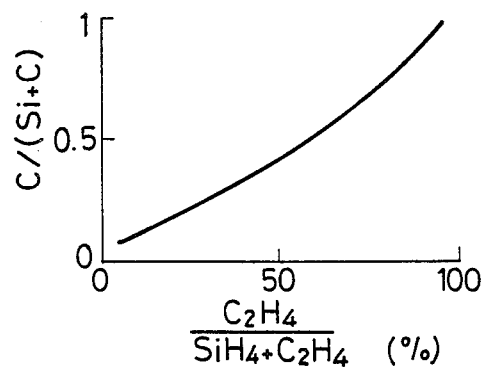
FIG. 8 is a graph showing the relationship between the source gas composition and the silicon-carbon composition of an amorphous material whose main components are silicon and carbon that is employed in the electro-optical device of the present invention.

In one embodiment, the amorphous material whose main components are silicon and carbon was produced by a plasma CVD process using the mixed gas of ethylene gas and monosilane gas to about 1500 Å. The amorphous material whose main components are silicon and carbon, produced by the above process, included about $10^{22}(cm^{-3})$ of hydrogen. As shown in FIG. 4, the amorphous material whose main components are silicon and carbon has a steeper slant than that of a different amorphous material whose main components are silicon and nitrogen. That is, a rather high nonlinearity is provided. FIG. 7 shows the correlation under the condition of 1(MV/cm) between the source gas ratio and the specific resistance of the amorphous material produced by the foregoing process whose main components are silicon and carbon. As will be appreciated from FIG. 7 with respect to the silicon-carbon composition in the amorphous thin film that was detected by the Auger electro spectroscopy, the larger the proportion of ethylene gas in the source gases, the greater the composition of carbon becomes. Therefore, the composition of the amorphous material produced by the foregoing process whose main components are silicon and carbon can be controlled with the source gas composition, thereby controlling the film resistance. Of course, the current-voltage characteristic of the foregoing amorphous material can be controlled also by changing conditions other than the source gas composition ratio, such as power, pressure, substrate temperature, and source gas total flow rate.

Further, the current-voltage characteristic of the foregoing amorphous material can be controlled also by mixing a few ppm to a few percent of gas of phosphine, diborane, etc. with the source gases, or by doping phosphorous and boron correspondingly.

Although in the embodiment of the present invention the process of producing the amorphous material, whose main components are silicon and carbon, used monosilane and ethylene as the main source gases, silane of higher order such as disilane can be used instead of nonosilane, and instead of ethylene can be used hydrocarbon of ethylene series, hydrocarbon of methane series, hydrocarbon of acetylene series, etc. Further, the currentvoltage characteristic of the foregoing amorphous material can be controlled also by diluting the source gases with rare gas such as argon, or hydrogen gas at the time of producing the amorphous material. Although the process of producing the foregoing amorphous material has been described exemplarily as being done by the plasma CVD process, it can be achieved also by a vacuum or atmospheric CVD process of a sputtering process.

When applying this type of nonlinear resistance material to the liquid crystal electro-optical device, the resistance $R_I$ of the nonlinear resistance element will be set as follows. That is, it is enough that the $R_I$ be $10^7-10^8(\Omega)$ at a voltage $V_{ON}$ applied at the time of display lighting, more than $10^8(\Omega)$ at a maximum voltage $V_{OFF}$ applied at the time of non-lighting, and equal to a liquid crystal resistance $R_{LC}$ at a voltage $V_{ON}$ applied during non-selection periods. When the overlapping area among conductor—amorphous material—conductor was 120($\mu m^2$), the thickness of the amorphous material was 1000 Å, and the driving voltage was lower than 30(V); driving could be carried out with an amorphous material with the carbon-silicon composition ratio, C/ Si, ranging from 0.05 to 1.5, preferably 0.5 to 0.9.

When the nonlinear resistance elements made of the nonlinear resistance thin film according to the present invention, whose characteristic is shown by curve a in FIG. 4, where employed in a large-size liquid crystal electro-optical device, the contrast was enhanced, the driving voltage could be lowered from 20 (V) (of the prior art) to 14 (V), and thus the power consumption was reduced, compared with the case of employing the conventional silicon nitride film whose characteristic is shown by curve b. In addition, no display fleck appeared, and a uniform display screen was provided. In this case, the silicon-carbon composition ratio of the amorphous material was $C/(Si+C)=0.4$.

As described above, the enhancement of the nonlinearity attained by the use of the silicon carbide film, not by the use of the conventional silicon nitride film, was realized owing to the amorphous material whose siliconcarbon composition ratio was $C/(Si+C)=0.05$ to 0.5.

For reference, the nonlinear resistance element according to the present invention utilizes the Frenkel-Poole current becoming dominant in a high-electric field region of a high-resistance material having a certain film thickness; accordingly, within a proper range of operation voltage, a tunnel current becomes dominant when the film thickness is too thin, or an ohmic current becomes dominant when it is too thick, so that either case degrades the nonlinearity of the element.

The inventor of the subject application has confirmed that the Frenkel-Poole current became dominant within the normal range of operation voltage for the foregoing nonlinear resistance thin film with the film thickness ranging from 500 Å to 3000 Å.

As described above, the present invention employs amorphous material made of a plurality of chemical elements as the nonlinear element material, thus it is possible to change the specific resistance and permittivity of the amorphous material freely by changing the composition ratio thereof. Therefore, where the area per pixel of the nonlinear element is set, it is possible to make the current-voltage characteristic and capacitance of each element optimal by regulating not only the thickness of the nonlinear element, as done in the prior art, but also the composition ratio of the element. Consequently, there can be obtained the electro-optical device providing good picture quality, such as good contrast.

Although in the foregoing embodiment the nonlinear element amorphous material has been described as including Si and C as the main components, other amorphous materials may be employed to make optimal the current-voltage characteristic and capacitance of the electro-optical element of the present invention, these materials being made of Si and N, Si and O, Si and N and O, Ge and C, Ge and N, Ge and O, Ge and N and O, or As and Se, as disclosed in U.S. patent application Ser. Nos. 784,239 and 863,199, etc.

Although the foregoing embodiment has been described as application to the liquid crystal electro-optical device, it can be applied also to electro-optical devices employing materials having other electro-optical effect such as electrochromism. Accordingly, it will be clear that the use of the amorphous silicon carbide having high nonlinearity improves the contrast and reduces the power consumption because of low voltage driving.

What is claimed is:

1. An electro-optical device comprising: a pair of substrates, at least one of the substrates being light-transmissive; an electro-optical material sandwiched between the substrates; a plurality of electro-optical switching elements disposed on an inner surface of at least one of the substrates, each of the switching elements including a first electrode layer, a non-linear-resistive layer substantially composed of an amorphous material of silicon and carbon and a picture element electrode electrically connected to the first electrode layer through the non-linear-resistive layer; and a second electrode layer disposed on an inner surface of the other substrate to define a plurality of picture elements between the second electrode layer and the plurality of picture element electrodes for applying a voltage to the electro-optical material in a desired picture element.

2. An electro-optical device as claimed in claim 1; wherein the device comprises a display device.

3. An electro-optical device as claimed in claim 1; wherein the first electrode layer is composed of metal.

4. An electro-optical device as claimed in claim 1; wherein the electro-optical material comprises a liquid crystal.

5. An electro-optical device as claimed in claim 1; wherein the device is driven by a multiplex driving method.

6. An electro-optical device as claimed in claim 1; wherein the atom composition ratio $C/Si=x$ of the amorphous material is as follows, $$0.05 \leq x \leq 1.5.$$

7. An electro-optical device as claimed in claim 1; wherein the atom composition ratio $C/Si=x$ of the amorphous material is as follows, $$0.05 \leq x \leq 0.9.$$

8. An electro-optical device as claimed in claim 1; wherein the non-linear-resistive layer is light-transmissive.

9. An electro-optical device as claimed in claim 1; wherein the non-linear-resistive layer has a thickness of 500Å to 3000Å.

10. An electro-optical device as claimed in claim 1; wherein the non-linear-resistive layer is formed by means of low pressure CVD, normal pressure CVD, plasma CVD or sputtering.

11. A switching device formed on a substrate, comprising: a substrate; and a plurality of electro-optical switching elements on the substrate, each of the switching elements including a first electrode layer, a non-linear-resistive layer substantially composed of an amorphous material of silicon and carbon and a picture element electrode electrically connected to the first electrode layer through the non-linear-resistive layer.

12. A switching device as claimed in claim 11; wherein the atom composition ratio $C/Si=x$ of the amorphous material is as follows, $$0.05 \leq x \leq 1.5.$$

13. A switching device as claimed in claim 11; wherein the non-linear-resistive layer has a thickness of 500Å to 3000Å.

* * * * *